(12) United States Patent
Diehl et al.

(10) Patent No.: US 11,632,016 B2
(45) Date of Patent: Apr. 18, 2023

(54) TUNING OF A KINEMATIC RELATIONSHIP BETWEEN MEMBERS

(71) Applicant: EDDY CURRENT LIMITED PARTNERSHIP, Wellington (NZ)

(72) Inventors: Andrew Karl Diehl, Wellington (NZ); Christopher James Allington, Wellington (NZ)

(73) Assignee: EDDY CURRENT LIMITED PARTNERSHIP, Christchurch (NZ)

( * ) Notice: Subject to any disclaimer, the term of this patent is extended or adjusted under 35 U.S.C. 154(b) by 0 days.

(21) Appl. No.: 17/702,510

(22) Filed: Mar. 23, 2022

(65) Prior Publication Data
US 2022/0231574 A1 Jul. 21, 2022

Related U.S. Application Data

(63) Continuation of application No. 16/953,070, filed on Nov. 19, 2020, now Pat. No. 11,316,404, which is a
(Continued)

(30) Foreign Application Priority Data

Aug. 18, 2014 (NZ) ........................................ 627630

(51) Int. Cl.
*H02K 7/10* (2006.01)
*H02K 7/104* (2006.01)
(Continued)

(52) U.S. Cl.
CPC ............ *H02K 7/104* (2013.01); *B60L 3/0007* (2013.01); *B60L 7/28* (2013.01); *B60R 22/343* (2013.01);
(Continued)

(58) Field of Classification Search
CPC ........ B60L 3/0007; B60L 7/28; B60R 22/343; F16D 43/14; H02K 2213/09; H02K 49/04;
(Continued)

(56) References Cited

U.S. PATENT DOCUMENTS 2,058,024 A 10/1936 Logan, Jr.
2,122,312 A 6/1938 Cassion
(Continued)

FOREIGN PATENT DOCUMENTS

CN 1783674 A 6/2006
CN 101820952 A 9/2010
(Continued)

OTHER PUBLICATIONS

Extended European Search Report, dated Apr. 6, 2018, for European Application No. 15864540.8-1201, 26 pages.
(Continued)

*Primary Examiner* — Naishadh N Desai
(74) *Attorney, Agent, or Firm* — Seed Intellectual Property Law Group LLP

(57) ABSTRACT

Described herein is a device comprising members in a kinematic relationship. The kinematic relationship is at least partially governed by at least one magnetically induced force that introduces a force threshold that, in effect, provides a threshold to part movement and confers a degree of hysteresis, preventing movement until a sufficiently large energizing force is applied. The effect may be further altered by use of an additional magnetically induced force interaction with at least one further member to urge or slow movement once started and/or to prevent movement once a new position is reached.

21 Claims, 8 Drawing Sheets

Related U.S. Application Data continuation of application No. 16/124,688, filed on Sep. 7, 2018, now Pat. No. 10,873,242, which is a continuation of application No. 15/504,632, filed as application No. PCT/NZ2015/050113 on Aug. 18, 2015, now Pat. No. 10,110,089.

(51) Int. Cl.

| | | |
|---|---|---|
| *B60L 7/28* | (2006.01) | |
| *B60L 3/00* | (2019.01) | |
| *F16D 43/14* | (2006.01) | |
| *B60R 22/343* | (2006.01) | |
| *H02K 49/04* | (2006.01) | |

(52) U.S. Cl.
CPC .............. *F16D 43/14* (2013.01); *H02K 7/10* (2013.01); *H02K 49/04* (2013.01); *H02K 2213/09* (2013.01); *Y02T 10/64* (2013.01)

(58) Field of Classification Search
CPC ............ H02K 7/10; H02K 7/104; H04R 5/04; H04S 1/002; H04S 2420/01; H04S 2420/03; H04S 3/00; H04S 3/008; H04S 3/02; H04S 7/303; Y02T 10/06
See application file for complete search history.

(56) References Cited

U.S. PATENT DOCUMENTS

| | | |
|---|---|---|
| 2,122,315 A | 6/1938 | Fosty et al. |
| 2,272,509 A | 2/1942 | Cavallo |
| 2,409,009 A | 10/1946 | Bakke |
| 2,428,104 A | 9/1947 | Winther |
| 2,437,871 A | 3/1948 | Wood |
| 2,492,776 A | 12/1949 | Winther |
| 2,771,171 A | 11/1956 | Schultz |
| 2,807,734 A | 9/1957 | Lehde |
| 3,364,795 A | 1/1968 | De Coye De Castelet |
| 3,447,006 A | 5/1969 | Bair |
| 3,721,394 A | 3/1973 | Reiser |
| 3,868,005 A | 2/1975 | McMillan |
| 3,934,446 A | 1/1976 | Avitzur |
| 3,962,595 A | 6/1976 | Eddens |
| 3,967,794 A | 7/1976 | Fohl |
| 4,078,719 A | 3/1978 | Durland et al. |
| 4,093,186 A | 6/1978 | Golden |
| 4,224,545 A | 9/1980 | Powell |
| 4,271,944 A | 6/1981 | Hanson |
| 4,306,688 A | 12/1981 | Hechler, IV |
| 4,416,430 A | 11/1983 | Totten |
| 4,434,971 A | 3/1984 | Cordrey |
| 4,544,111 A | 10/1985 | Nakajima |
| 4,561,605 A | 12/1985 | Nakajima |
| 4,567,963 A | 2/1986 | Sugimoto |
| 4,612,469 A | 9/1986 | Muramatsu |
| 4,676,452 A | 6/1987 | Nakajima |
| 4,690,066 A | 9/1987 | Morishita et al. |
| 4,708,366 A | 11/1987 | Doty |
| 4,729,525 A | 3/1988 | Rumpf |
| 4,826,150 A | 5/1989 | Minoura |
| 4,846,313 A | 7/1989 | Sharp |
| 4,895,317 A | 1/1990 | Rumpf et al. |
| 4,938,435 A | 7/1990 | Varner et al. |
| 4,957,644 A | 9/1990 | Price et al. |
| 4,974,706 A | 12/1990 | Maji et al. |
| 5,054,587 A | 10/1991 | Matsui et al. |
| 5,064,029 A | 11/1991 | Araki et al. |
| 5,084,640 A | 1/1992 | Morris et al. |
| 5,205,386 A | 4/1993 | Goodman et al. |
| 5,248,133 A | 9/1993 | Okamoto et al. |
| 5,272,938 A | 12/1993 | Hsu et al. |
| 5,342,000 A | 8/1994 | Berges et al. |
| 5,392,881 A | 2/1995 | Cho et al. |
| 5,441,137 A | 8/1995 | Organek et al. |
| 5,465,815 A | 11/1995 | Ikegami |
| 5,477,093 A | 12/1995 | Lamb |
| 5,483,849 A | 1/1996 | Orii et al. |
| 5,495,131 A | 2/1996 | Goldie et al. |
| 5,636,804 A | 6/1997 | Jeung |
| 5,692,693 A | 12/1997 | Yamaguchi |
| 5,711,404 A | 1/1998 | Lee |
| 5,712,520 A | 1/1998 | Lamb |
| 5,722,612 A | 3/1998 | Feathers |
| 5,742,986 A | 4/1998 | Corrion et al. |
| 5,779,178 A | 7/1998 | McCarty |
| 5,791,584 A | 8/1998 | Kuroiwa |
| 5,822,874 A | 10/1998 | Nemes |
| 5,862,891 A | 1/1999 | Kröger et al. |
| 5,928,300 A | 7/1999 | Rogers et al. |
| 6,041,897 A | 3/2000 | Saumweber et al. |
| 6,042,517 A | 3/2000 | Gunther et al. |
| 6,051,897 A | 4/2000 | Wissler et al. |
| 6,062,350 A | 5/2000 | Spieldiener et al. |
| 6,086,005 A | 7/2000 | Kobayashi et al. |
| 6,209,688 B1 | 4/2001 | Kuwahara |
| 6,220,403 B1 | 4/2001 | Kobayashi et al. |
| 6,279,682 B1 | 8/2001 | Feathers |
| 6,293,376 B1 | 9/2001 | Pribonic |
| 6,412,611 B1 | 7/2002 | Pribonic |
| 6,460,828 B1 | 10/2002 | Gersemsky et al. |
| 6,466,119 B1 | 10/2002 | Drew |
| 6,523,650 B1 | 2/2003 | Pribonic et al. |
| 6,533,083 B1 | 3/2003 | Pribonic et al. |
| 6,557,673 B1 | 5/2003 | Desta et al. |
| 6,561,451 B1 | 5/2003 | Steinich |
| 6,659,237 B1 | 12/2003 | Pribonic |
| 6,756,870 B2 | 6/2004 | Kuwahara |
| 6,793,203 B2 | 9/2004 | Heinrichs et al. |
| 6,918,469 B1 | 7/2005 | Pribonic et al. |
| 6,973,999 B2 | 12/2005 | Ikuta et al. |
| 7,011,607 B2 | 3/2006 | Kolda et al. |
| 7,014,026 B2 | 3/2006 | Drussel et al. |
| 7,018,324 B1 | 3/2006 | Lin |
| 7,279,055 B2 | 10/2007 | Schuler |
| 7,281,612 B2 | 10/2007 | Hsieh |
| 7,281,620 B2 | 10/2007 | Wolner et al. |
| 7,513,334 B2 | 4/2009 | Calver |
| 7,528,514 B2 | 5/2009 | Cruz et al. |
| 8,037,978 B1 | 10/2011 | Boren |
| 8,272,476 B2 | 9/2012 | Hartman et al. |
| 8,342,294 B2 | 1/2013 | Madoz Michaus et al. |
| 8,424,460 B2 | 4/2013 | Lerner et al. |
| 8,490,751 B2 | 7/2013 | Allington et al. |
| 8,601,951 B2 | 12/2013 | Lerner |
| 9,199,103 B2 | 12/2015 | Hetrich et al. |
| 9,242,128 B2 | 1/2016 | Macy |
| 2002/0162477 A1 | 11/2002 | Palumbo |
| 2002/0179372 A1 | 12/2002 | Schreiber et al. |
| 2003/0116391 A1 | 6/2003 | Desta et al. |
| 2003/0168911 A1 | 9/2003 | Anwar |
| 2003/0211914 A1 | 11/2003 | Perkins et al. |
| 2004/0055836 A1 | 3/2004 | Pribonic et al. |
| 2004/0073346 A1 | 4/2004 | Roelleke |
| 2004/0168855 A1 | 9/2004 | Leon |
| 2004/0191401 A1 | 9/2004 | Bytnar et al. |
| 2005/0051659 A1 | 3/2005 | Wolner et al. |
| 2005/0082410 A1 | 4/2005 | Tanaka et al. |
| 2005/0117258 A1 | 6/2005 | Ohta et al. |
| 2005/0189830 A1 | 9/2005 | Corbin, III et al. |
| 2005/0263356 A1 | 12/2005 | Marzano et al. |
| 2006/0219498 A1 | 10/2006 | Organek et al. |
| 2006/0278478 A1 | 12/2006 | Pribonic et al. |
| 2007/0000741 A1 | 1/2007 | Pribonic et al. |
| 2007/0001048 A1 | 1/2007 | Wooster et al. |
| 2007/0135561 A1 | 6/2007 | Rath et al. |
| 2007/0228202 A1 | 10/2007 | Scharf et al. |
| 2007/0228713 A1 | 10/2007 | Takemura |
| 2007/0256906 A1 | 11/2007 | Jin et al. |
| 2008/0059028 A1 | 3/2008 | Willerton |
| 2008/0074223 A1 | 3/2008 | Pribonic |
| 2008/0087510 A1 | 4/2008 | Pribonic |
| 2008/0105503 A1 | 5/2008 | Pribonic |
| 2008/0106420 A1 | 5/2008 | Rohlf |

(56) References Cited

U.S. PATENT DOCUMENTS

| | | |
|---|---|---|
| 2008/0135579 A1 | 6/2008 | Bertram et al. |
| 2009/0026303 A1 | 1/2009 | Schmitz et al. |
| 2009/0032785 A1 | 2/2009 | Jones |
| 2009/0084883 A1 | 4/2009 | Casebolt et al. |
| 2009/0114892 A1 | 5/2009 | Lesko |
| 2009/0166459 A1 | 7/2009 | Niitsuma et al. |
| 2009/0178887 A1 | 7/2009 | Reeves et al. |
| 2009/0211846 A1 | 8/2009 | Taylor |
| 2009/0319212 A1 | 12/2009 | Cech et al. |
| 2010/0032255 A1 | 2/2010 | Conti et al. |
| 2010/0065373 A1 | 3/2010 | Stone et al. |
| 2010/0112224 A1 | 5/2010 | Lott |
| 2010/0116922 A1 | 5/2010 | Choate et al. |
| 2010/0211239 A1 | 8/2010 | Christensen et al. |
| 2011/0084158 A1 | 4/2011 | Meillet et al. |
| 2011/0114907 A1* | 5/2011 | Hartman ............. A62B 1/08 254/268 |
| 2011/0147125 A1 | 6/2011 | Blomberg |
| 2011/0166744 A1 | 7/2011 | Lu et al. |
| 2011/0174914 A1 | 7/2011 | Yang |
| 2011/0175473 A1 | 7/2011 | Kitabatake et al. |
| 2011/0240403 A1 | 10/2011 | Meillet |
| 2011/0297778 A1 | 12/2011 | Meillet et al. |
| 2012/0055740 A1 | 3/2012 | Allington et al. |
| 2012/0118670 A1 | 5/2012 | Olson et al. |
| 2012/0312540 A1 | 12/2012 | Lefebvre |
| 2013/0048422 A1 | 2/2013 | Hartman et al. |
| 2013/0087433 A1 | 4/2013 | Sejourne |
| 2013/0118842 A1 | 5/2013 | Lerner |
| 2013/0186721 A1 | 7/2013 | Bogdanowicz et al. |
| 2014/0048639 A1 | 2/2014 | Allington et al. |
| 2014/0110947 A1 | 4/2014 | Mongeau |
| 2014/0224597 A1 | 8/2014 | Takezawa et al. |
| 2014/0346909 A1 | 11/2014 | Vogler et al. |
| 2014/0375158 A1 | 12/2014 | Allington et al. |
| 2015/0196820 A1 | 7/2015 | Allington et al. |
| 2015/0266454 A1 | 9/2015 | McGowan |
| 2015/0352380 A1 | 12/2015 | Huang et al. |
| 2016/0052401 A1 | 2/2016 | McGowan et al. |
| 2016/0317936 A1 | 11/2016 | Diehl et al. |
| 2016/0360738 A1 | 12/2016 | Richardson |
| 2017/0244313 A1 | 8/2017 | Diehl et al. |
| 2017/0274261 A1 | 9/2017 | Allington et al. |
| 2017/0328424 A1 | 11/2017 | Allington et al. |
| 2017/0338728 A1 | 11/2017 | Diehl et al. |
| 2018/0245658 A1 | 8/2018 | Diehl et al. |
| 2018/0264296 A1 | 9/2018 | Diehl et al. |
| 2018/0269767 A1 | 9/2018 | Diehl et al. |
| 2018/0269768 A1 | 9/2018 | Diehl et al. |
| 2018/0269769 A1 | 9/2018 | Allington et al. |
| 2018/0370484 A1 | 12/2018 | Diehl et al. |

FOREIGN PATENT DOCUMENTS

| | | |
|---|---|---|
| CN | 202203305 U | 4/2012 |
| CN | 102497085 A | 6/2012 |
| CN | 102627063 A | 8/2012 |
| CN | 103244577 A | 8/2013 |
| CN | 103326538 A | 9/2013 |
| DE | 93 00 966 U1 | 3/1993 |
| DE | 10 2005 032 694 A1 | 1/2007 |
| EP | 0 247 818 A2 | 12/1987 |
| EP | 0 460 494 A1 | 12/1991 |
| EP | 0 909 684 A2 | 4/1999 |
| EP | 1 094 240 A2 | 4/2001 |
| EP | 1 401 087 A1 | 3/2004 |
| EP | 1 432 101 A1 | 6/2004 |
| EP | 1 480 320 A1 | 11/2004 |
| EP | 1 564 868 A1 | 8/2005 |
| EP | 1 244 565 B1 | 7/2006 |
| GB | 721748 A | 1/1955 |
| GB | 908128 A | 10/1962 |
| GB | 2 340 461 A | 2/2000 |
| GB | 2 352 644 A | 2/2001 |
| GB | 2 352 645 A | 2/2001 |
| GB | 2 352 784 A | 2/2001 |
| GB | 2 357 563 A | 6/2001 |
| JP | 49-097163 A | 9/1974 |
| JP | S53-113528 U | 9/1978 |
| JP | 56-107092 | 8/1981 |
| JP | 58-25152 U | 2/1983 |
| JP | 60-259278 A | 12/1985 |
| JP | 63-64542 A | 3/1988 |
| JP | H04341624 A | 11/1992 |
| JP | H0538128 A | 2/1993 |
| JP | H05-72684 A | 3/1993 |
| JP | 5-296287 A | 11/1993 |
| JP | H05-84347 U | 11/1993 |
| JP | 8-252025 A | 10/1996 |
| JP | 10-98868 A | 4/1998 |
| JP | 10-140536 A | 5/1998 |
| JP | H10-178717 A | 6/1998 |
| JP | 10-304799 A | 11/1998 |
| JP | 11-119680 A | 4/1999 |
| JP | 11-189701 A | 7/1999 |
| JP | 11-315662 A | 11/1999 |
| JP | 2000-189530 A | 7/2000 |
| JP | 2000-316272 A | 11/2000 |
| JP | 2001-17041 A | 1/2001 |
| JP | 2003327369 A | 11/2003 |
| JP | 2005-353123 A | 12/2005 |
| JP | 2012-152316 A | 8/2012 |
| JP | 2012250828 A | 12/2012 |
| RU | 106 462 U1 | 7/2011 |
| WO | 95/16496 A1 | 6/1995 |
| WO | 96/17149 A1 | 6/1996 |
| WO | 98/47215 A1 | 10/1998 |
| WO | 01/38123 A1 | 5/2001 |
| WO | 03/055560 A1 | 7/2003 |
| WO | 2007/006818 A1 | 1/2007 |
| WO | 2007/060053 A1 | 5/2007 |
| WO | WO-2008116622 A1 * | 10/2008 ............... H02K 3/47 |
| WO | 2008/139127 A1 | 11/2008 |
| WO | 2009/013479 A1 | 1/2009 |
| WO | 2009/047469 A1 | 4/2009 |
| WO | 2009/108040 A1 | 9/2009 |
| WO | 2009/127142 A1 | 10/2009 |
| WO | 2010/104405 A2 | 9/2010 |

OTHER PUBLICATIONS

Extended European Search Report, dated Jul. 11, 2017, for European Application No. 14872681.3-1809, 10 pages.

Extended European Search Report, dated Mar. 29, 2018, for European Application No. 15834380,6-1201, 12 pages.

International Search Report and Written Opinion, dated Apr. 1, 2016, for International Application No. PCT/NZ2015/050206, 9 pages.

International Search Report and Written Opinion, dated Feb. 13, 2009, for International Application No. PCT/US2008/087863, 15 pages.

International Search Report and Written Opinion, dated Feb. 23, 2011, for International Application No. PCT/NZ2010/000011, 10 pages.

International Search Report and Written Opinion, dated Feb. 24, 2016, for International Application No. PCT/NZ2015/050207, 10 pages.

International Search Report and Written Opinion, dated Jan. 29, 2016, for International Application No. PCT/NZ2015/050208, 11 pages.

International Search Report and Written Opinion, dated Mar. 11, 2015, for International Application No. PCT/NZ2014/000245, 8 pages.

International Search Report and Written Opinion, dated Mar. 18, 2016, for International Application No. PCT/NZ2015/050209, 14 pages.

International Search Report and Written Opinion, dated Mar. 29, 2016, for International Application No. PCT/NZ2015/050205, 10 pages.

(56) References Cited

OTHER PUBLICATIONS

International Search Report and Written Opinion, dated Nov. 11, 2015, for International Application No. PCT/NZ2015/050114, 10 pages.

International Search Report and Written Opinion, dated Nov. 18, 2015, for International Application No. PCT/NZ2015/050113, 9 pages.

International Search Report and Written Opinion, dated Oct. 26, 2015, for International Application No. PCT/NZ2015/050115, 10 pages.

MSA Safety Incorporated, Auto Belay Stop Use Notice, Oct. 15, 2009, URL=http://verticalendeavors.com/minneapolis/auto-belay-stop-us-notice/, download date Apr. 6, 2017, 2 pages.

North Safety Products Europe B.V., "Climbing Wall Descender: FP2/5**GDD," *Climbing Wall Descent Controllers Instruction Manual v3*, Aug. 18, 2008, 20 pages.

TRUBLUE Auto Belays, Model TB150-12C Operator Manual, Jun. 20, 2013, 37 pages.

Final Office Action, dated Feb. 28, 2017, for U.S. Appl. No. 14/464,255, Allington et al., "Braking Mechanisms," 10 pages.

Notice of Allowance, dated Jul. 21, 2014, for U.S. Appl. No. 13/255,625, Allington et al., "Braking Mechanisms," 11 pages.

Office Action, dated Aug. 22, 2017, for U.S. Appl. No. 14/464,255, Allington et al., "Braking Mechanisms," 5 pages.

Office Action, dated Feb. 20, 2018, for U.S. Appl. No. 14/464,255, Allington et al., "Braking Mechanisms," 15 pages.

Office Action, dated Jan. 17, 2018, for U.S. Appl. No. 15/586,111, Allington et al., "Braking Mechanisms," 15 pages.

Office Action, dated Jan. 9, 2014, for U.S. Appl. No. 13/255,625, Allington et al., "Braking Mechanisms," 9 pages.

Office Action, dated Jul. 25, 2016, for U.S. Appl. No. 14/464,255, Allington et al., "Braking Mechanisms," 10 pages.

Park et al., "Torque analysis and measurements of a permanent magnet type Eddy current brake with a Halbach magnet array based on analytical magnetic field calculations," *Journal of Applied Physics* 115(17):17E707, 2014. (3 pages).

\* cited by examiner

TUNING OF A KINEMATIC RELATIONSHIP BETWEEN MEMBERS

RELATED APPLICATIONS

This application derives priority from New Zealand patent application number 627630 incorporated herein by reference.

BACKGROUND

Technical Field

Described herein is a device comprising members in a kinematic relationship, the kinematic relationship at least partially governed by at least one magnetically induced force that introduces a force threshold that, in effect, may provide a threshold and confer a degree of hysteresis, preventing movement until a sufficiently large energizing force is applied. The effect may be further altered by use of an additional magnetically induced force interaction with at least one further member to urge or slow movement once started and/or to prevent movement once a new position is reached.

Description of the Related Art

Eddy current formation may be used in a variety of ways to adjust the speed of rotation of a member. Various apparatus exist, for example in abseiling, to control the descent of a climber or for example, in personal protective equipment scenarios to prevent an injury causing fall. Other applications that use eddy current generation are in controlling pay-out of line in trains, cable cars, zip line devices and roller coasters.

One art device is published as US2012/0055740. This device utilizes a rotor assembly with arms that move relative to the rotor. The arms themselves may be conductive or magnetic or may have conductive or magnetic members attached thereto. When a rotational force is applied to the rotor, the arms move outwards from a central axis via centrifugal force and into a magnetic (or conductive) field. As the arms move through the field, eddy currents are generated, the strength of which is dependent on the speed of rotation. As the speed of rotation reduces, the arms are drawn back towards the axis of rotation via springs and/or a reduced centrifugal force acting on the arms. This device is widely used and provides an excellent means of changing the relative speed of parts.

One aspect of the above apparatus is that there is minimal hysteresis between activation of the braking effect and non-activation. This can result is rapid on-off switching of the braking effect termed 'chatter'. Chatter in some applications is particularly undesirable. For example, in fall safety applications, an auto belay may be attached to a harness worn by a person in danger of a fall. If a fall occurs, the device brakes and/or stops a fall thereby preventing injury or loss of life. Chatter becomes a hindrance in fall safety use. For example, unwanted activation of the brake effect may occur when the person moves suddenly (but not a fall). False activation may result in tiring the person; the person may loose balance and fall; or false activation simply becomes a general nuisance factor. In worst cases, chatter may discourage use of the fall safety device and lead to serious injury or loss of life.

Urging or slowing movement of the arms once started in the above device via a further input may also be useful depending on the end application of the device.

As may be appreciated, providing a means of both slowing and/or fully stopping relative movement between parts in a means that may be tuned to avoid inadvertent braking and induce a tunable degree of hysteresis may be useful or at least it provides the public with a choice.

Further aspects and advantages of the device will become apparent from the ensuing description that is given by way of example only.

BRIEF SUMMARY

Described herein is a device comprising members in a kinematic relationship, the kinematic relationship at least partially governed by at least one magnetically induced force that introduces a force threshold that, in effect, may provide a threshold and confer a degree of hysteresis, preventing movement until a sufficiently large energizing force is applied. The effect may be further altered by use of an additional magnetically induced force interaction with at least one further member to urge or slow movement once started and/or to prevent movement once a new position is reached.

In a first aspect, there is provided a device comprising:

at least one first member or a part thereof and at least one second member or a part thereof, the first and second members being approximately adjacent to each other and in a constrained kinematic relationship relative to each other;

at least one magnetically attracted relationship between the at least one first and second members forming a magnetically induced force between the members or a part thereof; and wherein the magnetically induced force provides a force threshold preventing movement between the members and, when this threshold is exceeded by application of an energizing force, relative motion occurs via a dynamic system according to the kinematic relationship between the at least one first member and at least one second member.

In a second aspect, there is provided a device comprising:

at least one first member or a part thereof coupled to a second member and at least one third member or a part thereof, the first and third members being approximately adjacent to each other and in a constrained kinematic relationship relative to each other;

at least one magnetically attracted relationship between the at least one first and third members forming a magnetically induced force between the members or a part thereof; and wherein the magnetically induced force provides a complementary force overcoming a force threshold resisting movement between at least the first and third members such that, when this threshold is exceeded by application of an energizing force:

(a) relative motion occurs via a dynamic system according to the kinematic relationship between the at least one first and third member; and (b) the induced force accelerates the motion of the first member relative to the third; and (c) the induced force provides a holding force resisting reversal of the relative motion.

In a third aspect, there is provided a brake comprising:
a device substantially as described above; and
wherein the at least one first member or a part thereof is at least partially electrically conductive and in a further kinematic relationship with an independent magnetic field such that:

(a) prior to a sufficient energizing force, the at least one first member and at least one second member remain magnetically coupled and a first no or low induced eddy current brake effect occurs; and (b) on application of an energizing force sufficient to overcome the magnetically induced force, the at least one first member moves into the magnetic field thereby inducing an eddy current brake effect on movement of the at least one first member or a part thereof relative to the magnetic field.

In a fourth aspect, there is provided a line dispensing device incorporating at least one device substantially as described above.

In a fifth aspect, there is provided a passenger seat restraint incorporating at least one device substantially as described above.

In a sixth aspect, there is provided a transmission drive incorporating at least one device to engage a rotational drive substantially as described above.

In a seventh aspect, there is provided a linear guided lifeline incorporating at least one device substantially as described above.

Numerous other applications of the device may also be possible as further outlined in the description below.

One advantage of the above device includes the ability to control when movement prescribed by the kinematic relationship occurs. In addition, a further advantage of the device is to also influence the kinematic relationship once movement commences. The magnitude of the inertia effect may be tuned between extremes of a high resistance to movement through to a low resistance to movement. In addition, through use of an additional magnetic member, the threshold and rate of movement via the kinematic relationship may also be influenced greater or less. Tuning in this way may have the effect of avoiding on/off chatter and confer a degree of hysteresis in the device action. Through a third member, deactivation may also be tuned so as to avoid accidental disengagement for example from a latch. Another, further advantage of the above device is the wide range of ability to control and vary movement via the kinematic relationship meaning the device is able to be used in a range of different ways and applications and may minimize the likelihood of false activations.

BRIEF DESCRIPTION OF THE SEVERAL VIEWS OF THE DRAWINGS

Further aspects of the device will become apparent from the following description that is given by way of example only and with reference to the accompanying drawings in which.

DETAILED DESCRIPTION

Figure 1:
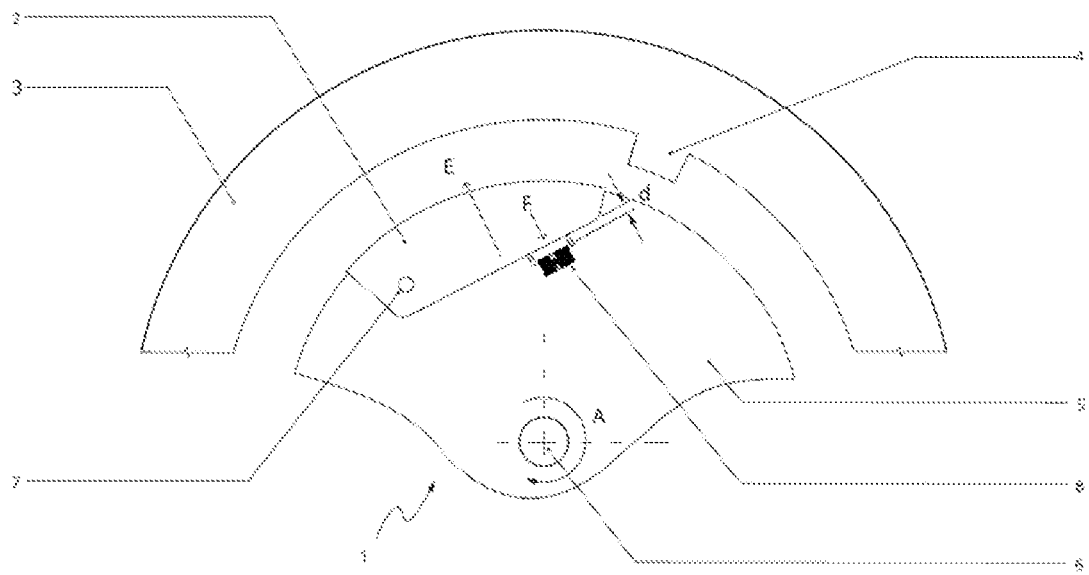
FIG. 1 illustrates a side view of one embodiment of a device in a magnetically attracted relationship.

As noted above, described herein is a device comprising members in a kinematic relationship, the kinematic relationship at least partially governed by at least one magnetically induced force that introduces a force threshold that, in effect, may provide a threshold and confer a degree of hysteresis, preventing movement until a sufficiently large energizing force is applied. The effect may be further altered by use of an additional magnetically induced force interaction with at least one further member to urge or slow movement once started and/or to prevent movement once a new position is reached.

For the purposes of this specification, the term 'about' or 'approximately' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'substantially' or grammatical variations thereof refers to at least about 50%, for example 75%, 85%, 95% or 98%.

The term 'comprise' and grammatical variations thereof shall have an inclusive meaning—i.e., that it will be taken to mean an inclusion of not only the listed components it directly references, but also other non-specified components or elements.

The term 'energizing force' and grammatical variations thereof refers to a force that acts to impose a rate of movement on an object.

The term 'dynamic' and grammatical variations thereof in the context of device or device part movement refers to forces induced by mechanical means and for the purposes of this specification, excludes forces that might arise from liquid fluid movement or pressure.

In a first aspect, there is provided a device comprising:
at least one first member or a part thereof and at least one second member or a part thereof, the first and second members being approximately adjacent to each other and in a constrained kinematic relationship relative to each other;
at least one magnetically attracted relationship between the at least one first and second members forming a magnetically induced force between the members or a part thereof; and wherein the magnetically induced force provides a force threshold preventing movement between the members and, when this threshold is exceeded by application of an energizing force, relative motion occurs via a dynamic system according to the kinematic relationship between the at least one first member and at least one second member.

Relative motion in the above aspect between the at least one first member and the at least one second member may initially be prevented by the device above and wherein the device further comprises:

at least one further magnetically attracted relationship between a third member and the at least one first member and/or at least one second member forming a second magnetically induced force between the at least one third member or a part thereof and the first and/or second member or members or a part thereof; and wherein the second magnetically induced force provides a complementary force overcoming a force threshold resisting movement between the members such that, when this threshold is exceeded by application of an energizing force:

relative motion occurs via the kinematic relationship between the at least one first and second member; and (a) the second induced force accelerates the motion of the first and/or second member relative to the third member or members; and (b) the second induced force provides a holding force resisting reversal of the relative motion.

The first and second members may be coupled together. Coupling may be direct or indirect, for example via a spring or other member.

In a second aspect, there is provided a device comprising:

at least one first member or a part thereof coupled to a second member and at least one third member or a part thereof, the first and third members being approximately adjacent to each other and in a constrained kinematic relationship relative to each other;

at least one magnetically attracted relationship between the at least one first and third members forming a magnetically induced force between the members or a part thereof; and wherein the magnetically induced force provides a complementary force overcoming a force threshold resisting movement between at least the first and third members such that, when this threshold is exceeded by application of an energizing force:

(a) relative motion occurs via a dynamic system according to the kinematic relationship between the at least one first and third member; and (b) the induced force accelerates the motion of the first member relative to the third; and (c) the induced force provides a holding force resisting reversal of the relative motion.

The complementary force noted above may act with inertia forces on the first member or members to overcome the initial magnetically attracted relationship thereby altering the movement characteristics of the device.

The magnetically induced force described in the above aspects may be between at least one ferromagnetic element and/or region on and/or within the at least one first member and at least one magnetic element and/or region on and/or within the at least one second member.

The magnetically induced force may be between at least one ferromagnetic element and/or region on and/or within the at least one second member and at least one magnetic element and/or region on and/or within the at least one first member.

The magnetically induced force may be between at least one magnetic element and/or region on and/or within the at least one first member of a first polarity and at least one magnetic element and/or region on and/or within the at least one second member of a second polarity opposite to that of the first polarity.

As should be appreciated from the above examples, the way the magnetically induced force occurs may be varied, not limited to combinations of adjacent magnets or order or positioning of ferromagnetic and magnetic elements and respective members. Additionally, it should be appreciated, that the magnetically attracted material need not be limited to ferromagnetic material and may extend to paramagnetic materials—as such, use of the term 'ferromagnetic' or grammatical variations thereof herein, also encompasses other magnetically attracted materials including, but not limited to, paramagnetic materials.

Movement of the first member once the magnetically induced force is overcome may be direct—that is the first member moves directly due to the energizing force. The first member may instead move indirectly or by proxy at least in part due to the energizing force causing at least one additional mechanical part or force dynamic to move or interact with the first member and thereby subsequently causing motion of the first member. Indirect means may be a dynamic force transfer via another part such as a coupling or gear or a centrifugal force being imposed on the first member by direct force on another part. Indirect or proxy force transfer may have the advantage of being able to amplify the energizing force.

Static or dynamic positional and/or strength adjustment of the point of action of the magnetically induced force may also be completed by:

adjusting the position of a magnetic element or conductive region on the at least one first member or part thereof as the first member or second member moves; and/or, (a) adjusting the position of a magnetic element or conductive region on the at least one second member as the at least one first member or second member moves.

By way of example, the first member may comprise a slot and a portion of the first member comprising the magnetic element or conductive region moves within the slot as the first member as a whole moves on application of the energizing force. This additional means of adjusting movement may be useful to further alter the force dynamics and hence the way the parts interact and hence further change the force threshold.

Relative movement between the first member and additional member or members may be frictionless. Magnetic forces such as the induced force noted above and any subsequent forces acting on the first member may avoid friction contact. This may be useful to minimize mechanical wearing on the parts.

In one embodiment, movement between the parts is predominantly governed by dynamic forces. The device may be free of liquid fluid with all movement between the parts due to dynamic forces. Alternatively, the device may have some liquid fluid present but the predominant energizing force on the device members is dynamic force. Liquid based systems utilizing magnetics to alter kinematic relationships exist but these devices differ to that described herein in that that are often bi-stable—that is, the parts are only stable in two positions. In addition, movement predominantly or wholly relies on a force or pressure build up from the liquid fluid as opposed to dynamic forces. Liquid based devices also have inherent difficulties associated with sealing the liquid and more regular maintenance being required to ensure reliable running.

The kinematic relationship may be rotational or linear. With respect to a rotational relationship:

The at least one first member may be a pawl or arm shaped member or members that may be mechanically linked to a second member that may be a rotor that rotates on application of the energizing force; and/or The at least one first member may be positioned adjacent to the rotor and part of the at least one first member may move outside the region bound by the rotor on application of a sufficiently large energizing force to overcome the magnetically induced force; and/or The at least one first member may be pivotally attached to the rotor about a pivot axis offset from the rotor axis.

With respect to a linear relationship:

The at least one first member may be a pawl or arm shaped member or members that may be mechanically linked to a second member that may be a carriage that translates on application of the energizing force; and/or The at least one first member may be linearly attached to the carriage about a pivot axis offset from the direction of motion of the carriage.

The at least one first member or a part thereof may be positioned to engage with at least one latching member upon movement of the at least one first member and at least one second member when the energizing force is applied. Engagement of the at least one first member and at least one latching member may result in no relative motion between the at least one second member and the at least one latching member.

The third member may be at least one latching member positioned to engage with the at least one first member upon movement of the at least one first member when the energizing force is applied.

The at least one first member or a part thereof may be electrically conductive and, relative movement after the threshold is overcome causes the at least one first member to move into a magnetic field wherein an eddy current induced drag effect occurs on movement of the at least one first member.

The device may include a magnetic field that interacts with movement of the first member thereby inducing an eddy current drag force on the first member causing linear and/or rotational translation of the at least one first member about a line or point, inclined or offset respectively from the line of action of the eddy current induced drag force.

The at least one first member may move at least partially orthogonally to the direction of movement of the second member as defined by the kinematic relationship and/or pivotally relative to the magnetic field on application of the energizing force.

The kinematic relationship may be constrained by use of an aperture in the at least one first member defining the range of movement and a stop defines one or more distal points of the aperture. The magnetically attracted relationship may exist about each distal point of the aperture.

The magnetic field may be stationary or moving at a different relative speed to the at least one first member.

The rate at which the at least one first and second members move relative to each other may be further tuned by varying at least one of:

(a) the magnetic surface area;
(b) the magnetic force strength;
(c) the proximity of the at least one magnetic element and/or region to adjacent at least one magnetic or ferromagnetic element and/or regions;
(d) the geometry and/or magnetic properties of the at least one magnetic element;
(e) the ferromagnetic content of the at least one ferromagnetic element and/or regions;
(f) the magnetic susceptibility of the ferromagnetic material As should be appreciated from the above, the members may take various shapes or weights, factors that influence the activation and/or rate of motion of the member or members once movement is initiated. The magnetic interaction may for example be continuous across a first member length or spaced apart or of varying dimensions to thereby adjust the flux occurring. The magnetically interacting portion of the first or other members may be the whole member or only a portion thereof. Where only a portion of the member magnetically interacts, the location of the interacting portion either on the exterior, interior or part of the member, can be altered.

In a third aspect, there is provided a brake comprising:

a device substantially as described above; and wherein the at least one first member or a part thereof is at least partially electrically conductive and in a further kinematic relationship with an independent magnetic field such that, (a) prior to a sufficient energizing force, the at least one first member and at least one second member remain magnetically coupled and a first no or low induced eddy current brake effect occurs; and, (b) on application of an energizing force sufficient to overcome the magnetically induced force, the at least one first member moves into the magnetic field thereby inducing an eddy current brake effect on movement of the at least one first member or a part thereof relative to the magnetic field.

In a fourth aspect, there is provided a line dispensing device incorporating at least one device substantially as described above. Line dispensing devices such as auto belay devices are widely used to prevent falls in both recreational and industrial applications. In some cases, magnetically attracted relationships may be useful to tune the auto belay device characteristics.

In a fifth aspect, there is provided a passenger seat restraint incorporating webbing for extending and retracting, the webbing operatively coupled to at least one device substantially as described above. One example of a passenger seat restraint may be a seat belt used in a vehicle such as a car. Seat belts are a critical safety feature and the above described device may provide a useful alternative to existing designs particularly given the ability to tune the response in the wide variety of ways noted.

In a sixth aspect, there is provided a transmission drive incorporating at least one device to engage a rotational drive substantially as described above.

In a seventh aspect, there is provided a linear guided lifeline incorporating at least one device substantially as described above.

The above examples should not be seen as limiting since the devices described may be used for a wide variety of other applications, non-limiting examples including speed control of:

a rotor in a rotary turbine;
exercise equipment, e.g., rowing machines, epicyclic trainers;
roller-coasters and other amusement rides;
Elevator and escalator systems;

evacuation descenders and fire escape devices;
conveyer systems:
rotary drives in factory production facilities;
materials handling devices such as conveyer belts or a braking device in a chute;
dynamic display signage to control the rate of change of rotating signs;
roadside safety systems, e.g., the eddy current brake may be connected in a system to provide crash attenuation though the dissipation of energy via the brake;
seat belts in vehicles;
braking mechanisms for trolleys and carriages.

As noted above, one advantage of the above device includes the ability to control when movement prescribed by the kinematic relationship occurs. In addition, a further advantage of the device is to also influence the kinematic relationship once movement commences. The magnitude of the inertia effect may be tuned between extremes of a high resistance to movement through to a low resistance to movement. In addition, through use of an additional magnetic member, the threshold and rate of movement via the kinematic relationship may also be influenced greater or less. Tuning in this way may have the effect of avoiding on/off chatter and confer a degree of hysteresis in the device action. Through a third member, deactivation may also be tuned so as to avoid accidental disengagement for example from a latch. Another, further advantage of the above device is the wide range of ability to control and vary movement via the kinematic relationship meaning the device is able to be used in a range of different ways and applications and minimize the likelihood of false activations.

The embodiments described above may also be said broadly to consist in the parts, elements and features referred to or indicated in the specification of the application, individually or collectively, and any or all combinations of any two or more said parts, elements or features, and where specific integers are mentioned herein which have known equivalents in the art to which the embodiments relates, such known equivalents are deemed to be incorporated herein as of individually set forth, Where specific integers are mentioned herein which have known equivalents in the art to which this invention relates, such known equivalents are deemed to be incorporated herein as if individually set forth.

WORKING EXAMPLES

The above described device is now described by reference to specific examples.

For ease of description in the examples, only a single first member is typically shown although it should be appreciated that multiple first members may be used.

A magnetic field through which the first member(s) move and third or latching member are generally shown for prolixity as continuous regions. The magnetic field, (if present at all) may for example be a series of discrete magnets or even just one magnet. Similarly, the third member (if present) may take on various shapes or surface contours, with only a limited number of examples shown for clarity.

While certain movement, for example of the first member(s) may be shown in an example, it should be appreciated that the magnetic field if present, the second member and/or the third member(s) may also move or even the first member remain fixed while the other member(s) move.

Example 1

As illustrated by the schematic of FIG. 1, the device 1 in the embodiment shown comprises a first member 2 moving relative to a second member 5, in this example shown as being a rotor that rotates about rotor axis 6 in direction A. A third member 4 is also shown.

The first member 2 as shown is attached to the second member 5 and a kinematic relationship exists between the parts constrained by the first member pivot axis 7, the location of the third member 4 and the speed of rotation of the second member 5.

A magnetically induced force is in place between the first member 2 and the second member 5 via a magnet or magnets 8, in the Figure shown as being a block shape and linked to the second member 5. The first member 2 includes a portion 9 or as a whole is magnetically attracted to the magnet 8. The magnetically induced force prevents relative movement between the first member 2 and second member 5 until a threshold force F is exceeded by an energizing force E. In the embodiment of FIG. 1, the energizing force is created by rotation of the second member 5 sufficiently fast that due to centrifugal and inertial action, the threshold force F is overcome and the first member 2 rotates about the pivot axis 7.

Figure 2:
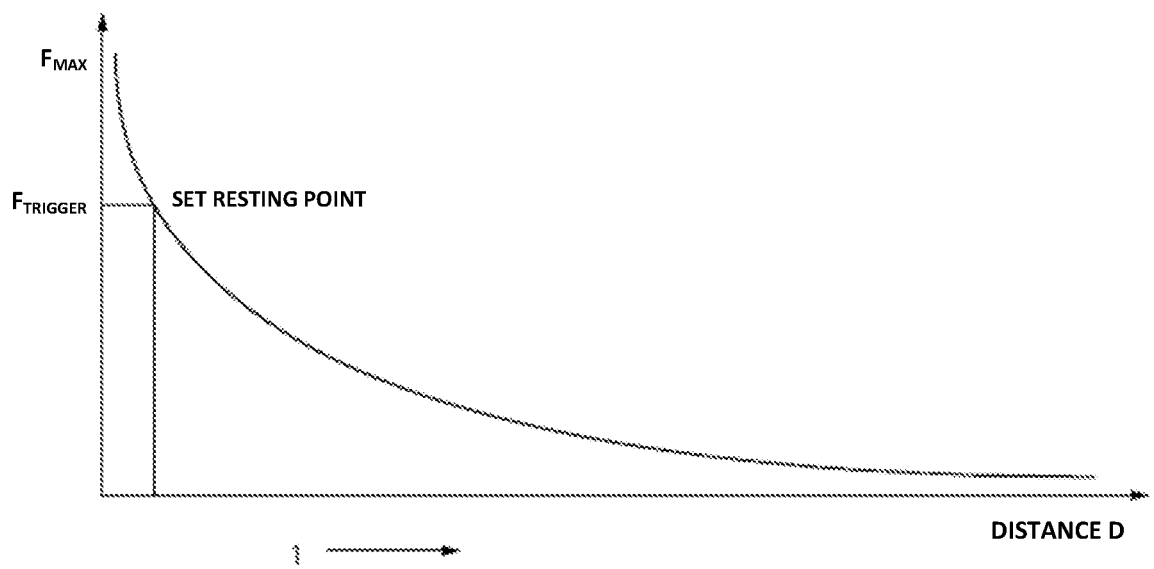
FIG. 2 illustrates a graph showing the relationship between the magnetically attracted force and movement of the pawl or first member.

FIG. 2 illustrates this action comparing movement of the first member 2 (termed a pawl in FIG. 2) versus the force F applied. No or minimal movement occurs until the energizing force is reached (marked as F trigger in FIG. 2) after which point the magnetically induced force dissipates quickly as the first member 2 moves away from the second member 5. As should be appreciated, introducing the input of a threshold force slows activation of the first member 2 and hence adjusts the timing of any subsequent event brought on by movement of the first member 2.

The kinematic relationship between the members 2, 5 may be altered in various ways, one example being to alter the threshold force by varying the conductivity of the first member 2 or by varying the magnet 8 dimensions and/or placement (e.g., recessed into the second member 5).

Example 2

Figure 3:
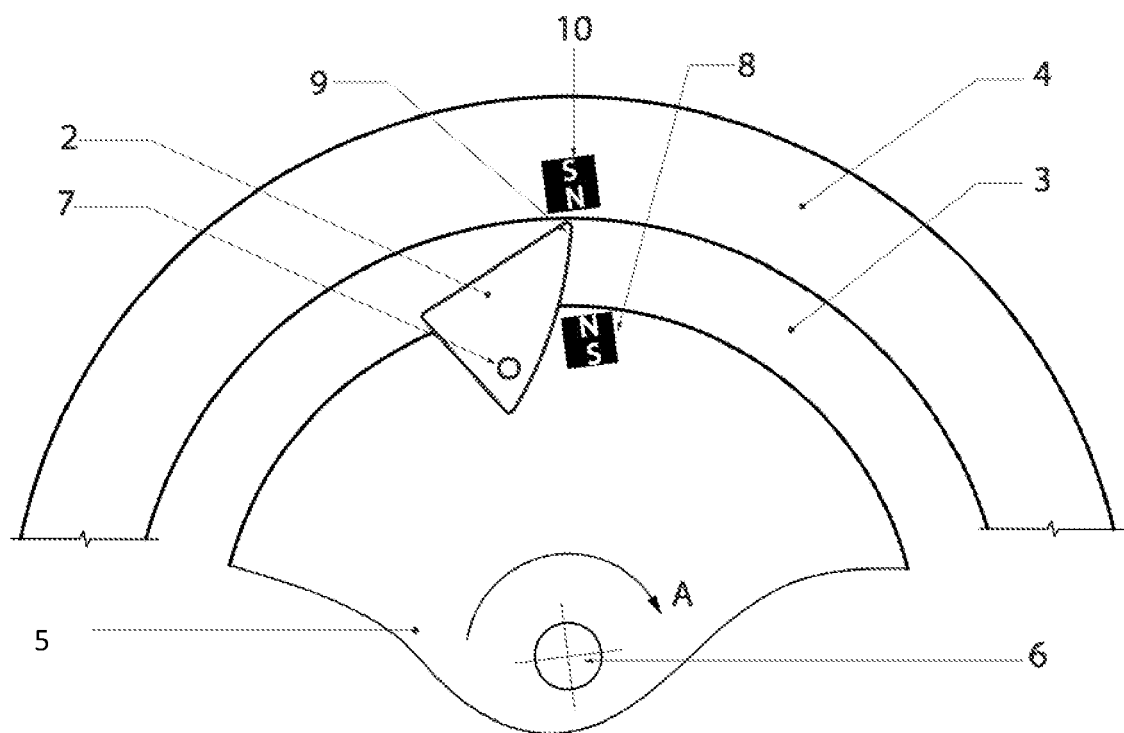
FIG. 3 illustrates a side view of an alternate embodiment incorporating a rotating second member and a first member with two magnetic relationships.

FIG. 3 illustrates an addition to the device of Example 1. In this example, a third member 4 is added, the third member 4 applying a magnetically induced force on the first member 2 thereby further changing the kinematic relationship between the various members 2, 4, 5. In the embodiment shown, a magnet is placed on the third member 4 that attracts a portion 9 or all of the first member 2. The induced force to the third member 4 is not sufficiently strong enough to overcome the induced force between the first member 2 and second member 5 until sufficient energizing force is applied (e.g., via rotation of the second member 5 about axis 6) to overcome the threshold force. When movement of the first member 2 starts to occur, the magnet on the third member 4 may then urge motion of the first member 2 to the third member 4. The magnet 10 on the third member 4 may also provide sufficient force to hold the first member 2 against the third member 4. A magnetic field 3 may lie adjacent to the first member 2 and may also apply a braking force on movement of the first member 2 due to magnetically induced eddy current effects.

Figure 4:
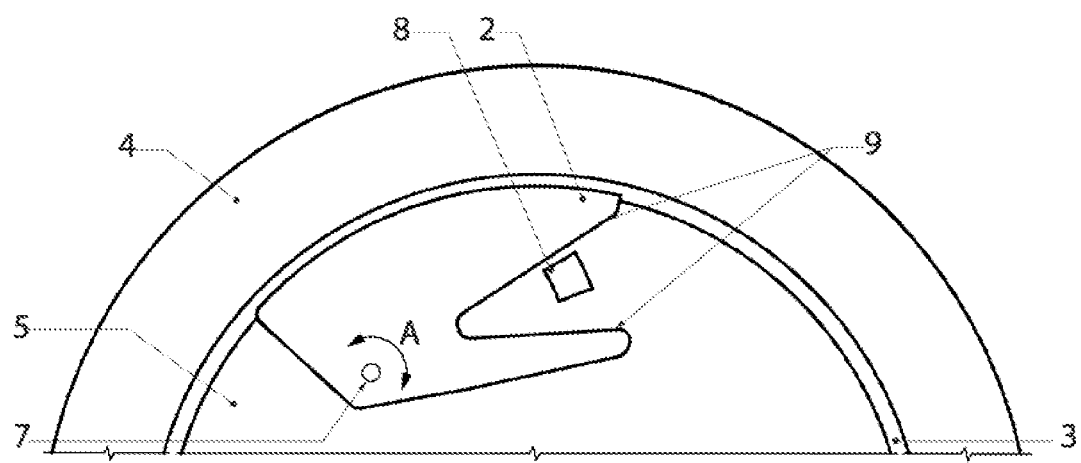
FIG. 4 illustrates a side view of an alternate embodiment incorporating a rotating second member and a first member with two magnetic relationships.

FIG. 4 illustrates an alternative embodiment that may be used to achieve the above interactions. In this case, the first member 2 is shaped to have a jaw and a stop connected to a second member 5 lies within the jaw region. The first member 2 is in a kinematic relationship with the second member 5 so that when the second member 5 rotates, a centrifugal force occurs on the first member 2 causing it to move outwards relative to the second member 5 axis of rotation about the first member pivot axis 7. The jaws of the first member 2 act to define maximal movement. The stop may be a magnet 8 that is magnetically attracted to a side 9 or all of the first member 2 jaws. This embodiment has a similar effect to that of FIG. 3 albeit that the first member jaws act as separate points where magnetically induced forces act.

Figure 5:
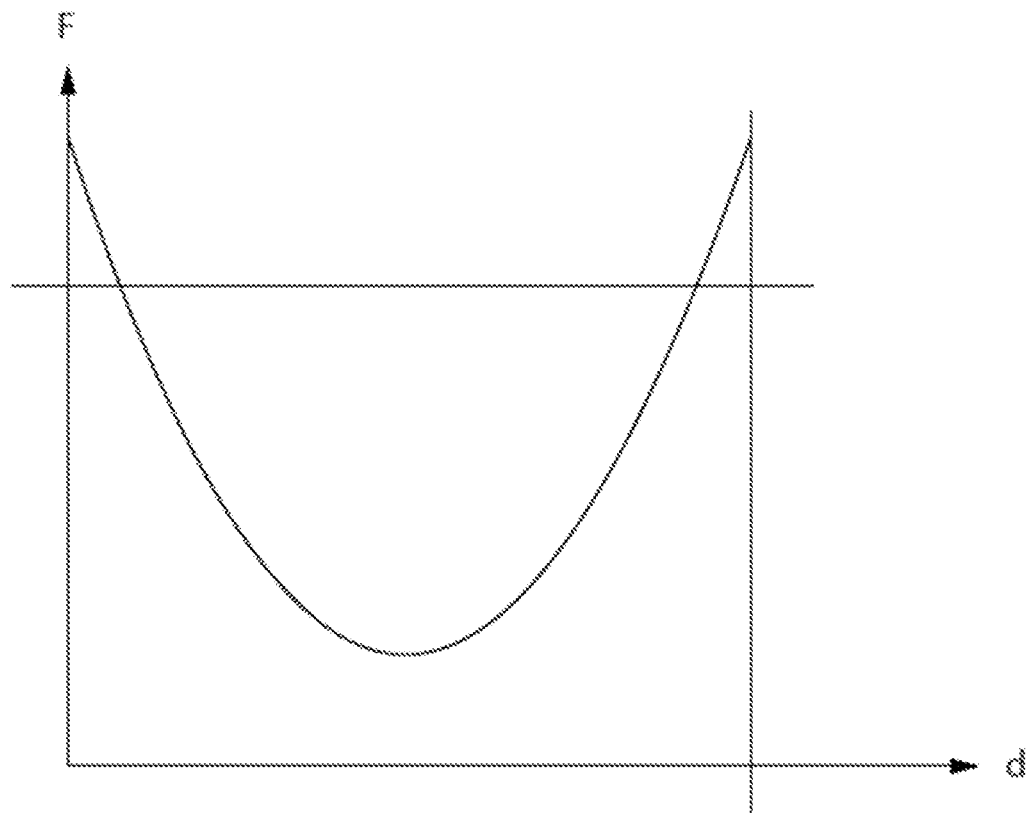
FIG. 5 illustrates a graph showing the modified relationship that occurs with the arrangement used in FIGS. 3 and 4.

FIG. 5 shows a graph of how the forces in either the embodiment of FIG. 3 or FIG. 4 would interact relative to the first member 2 as it moves. The magnetically induced force is high at either extreme of movement of the first member 2 and low midway. The magnetically induced force is overcome once the energizing force overcomes a threshold indicated by the words 'trigger' and 'hold' on the graph.

Example 3

Figure 6:
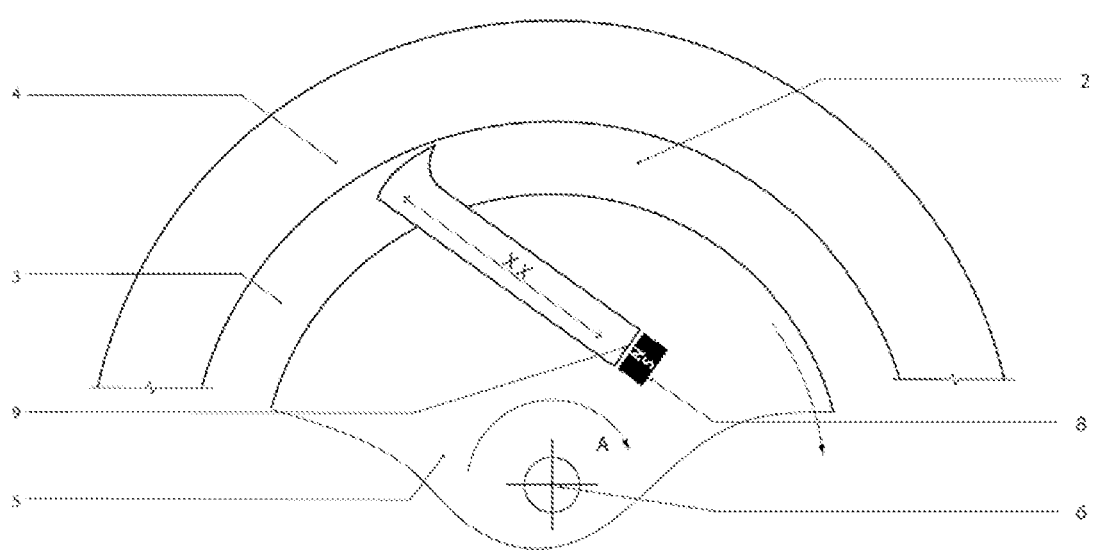
FIG. 6 illustrates a side view of an alternate embodiment incorporating a rod shaped first member.

FIG. 6 illustrates a further embodiment where the first member 2 takes the form of a rod, the rod 2 translating into or out of an aperture (not shown) in the second member 5 along line of translation marked XX. Rotation of the second member 5 about axis A induces an energizing force that, once the magnetically induced force between magnet 8 and the second member 5 is overcome, causes translation of the rod 2 out of the aperture and one end of the rod 2 may interact with a third member 4 via a further magnet (not shown). This example illustrates how the first member 2 may take on different shapes and forms and movement of the first member 2 may be via an axis of rotation as in earlier Examples or translation as in this example.

Example 4

Figure 7:
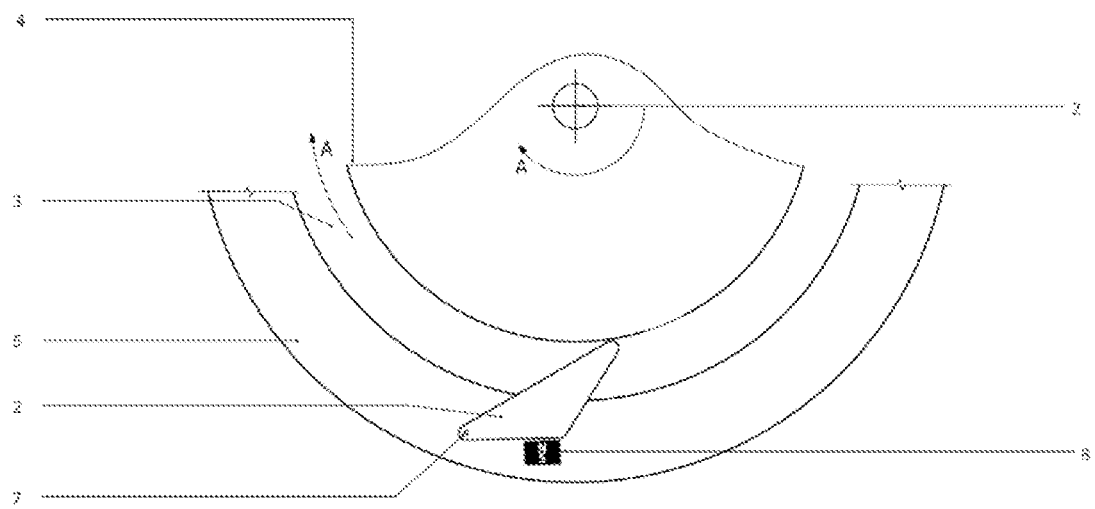
FIG. 7 illustrates a side view of an alternate embodiment incorporating a rotating third member and a fixed second member and relative moving first member.

FIG. 7 illustrates a further embodiment of the latch device 1. In this embodiment, the second member 5 and first member 2 lie on the outside circumference of a rotating magnetic field 3 and the third member 4, the axis of rotation being item 6 and the direction of movement being in a clockwise direction. The first member 2, on application of an energizing force, overcomes the magnetically induced force between the magnet 8 linked to the second member 5 and the first member 2, and then moves about a rotation axis 7 with at least part of the first member 2 moving into the magnetic field 3. In the embodiment shown, an eddy current drag force (not shown) is induced urging rotation of the first member 2 until the first member 2 engages with the third member 4 halting relative rotation of the third member 4 and magnetic field 3. Note that the third member 4 need not be present or instead, the third member 4 may simply act as a stop to further rotation of the first member 2 but not latch.

Example 5

Figure 8:
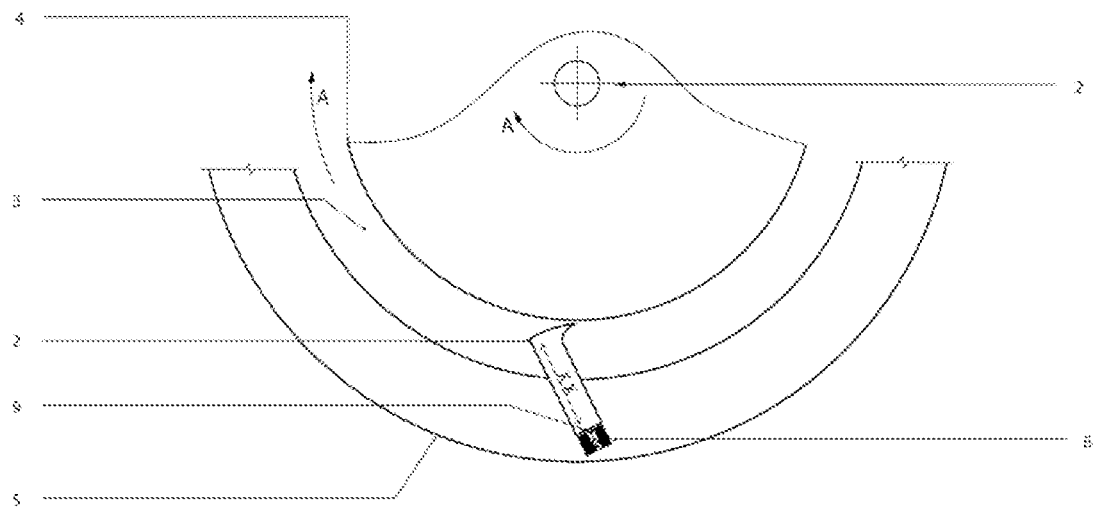
FIG. 8 illustrates a side view of an alternate embodiment to FIG. 7 incorporating a rod shaped first member.

As illustrated in FIG. 8, the same principle shown in FIG. 7 can be applied using the rod shaped first member 2 first discussed in Example 3 above. In this example, the second member 5 and first member rod 2 are fixed in position on a part of the circumference of the device 1 and the magnetic field 3 and third member 4 rotate about axis 6 in direction A. It should be noted that the first member rod 2 is offset in a direction inclined relative to the direction of rotation so as to allow translational movement of the rod 2 out of (and back into) the second member 5 under the influence of inertial effects.

Example 6

Figure 9:
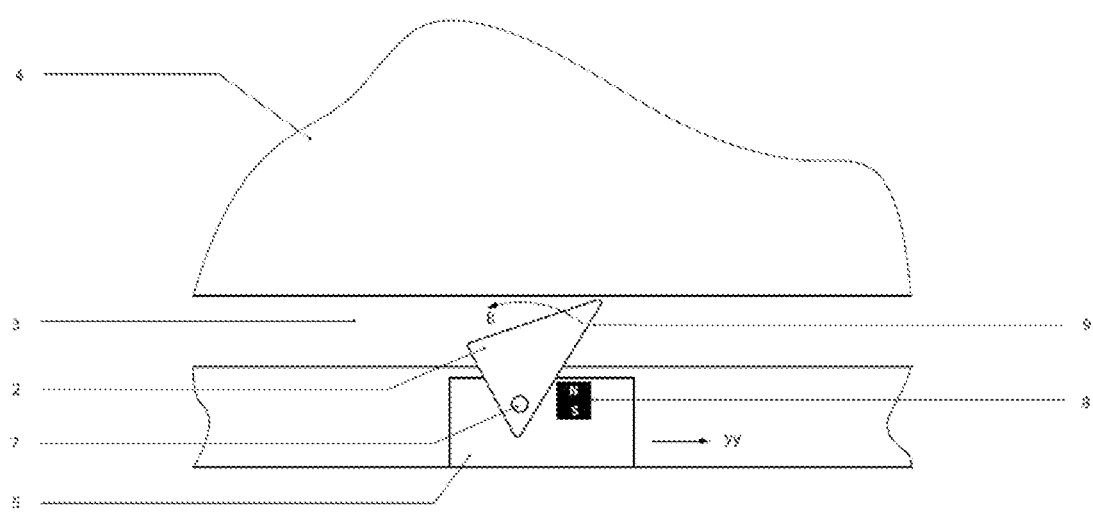
FIG. 9 illustrates a side view of an alternate embodiment incorporating a sliding second member and a pivoting first member pawl.

Referring to FIG. 9, an alternative embodiment is shown where linear motion is used as opposed to rotational motion illustrated in the above Examples.

The second member 5 moves along a plane in direction YY. A first member 2 in this case shown as a pawl with one end attached to a pivot axis 7 is fastened to the second member 5. A magnet 8 is located on the second member 5 that creates a magnetically induced force with the first member 2. When the second member 5 moves in a linear direction YY, the first member 2 overcomes a threshold force and then moves into the magnetic field 3 and is urged via eddy current drag forces and inertial forces to rotate about the axis 7 until the first member 2 or a part there of strikes and engages the third member 4.

Example 7

Figure 10:
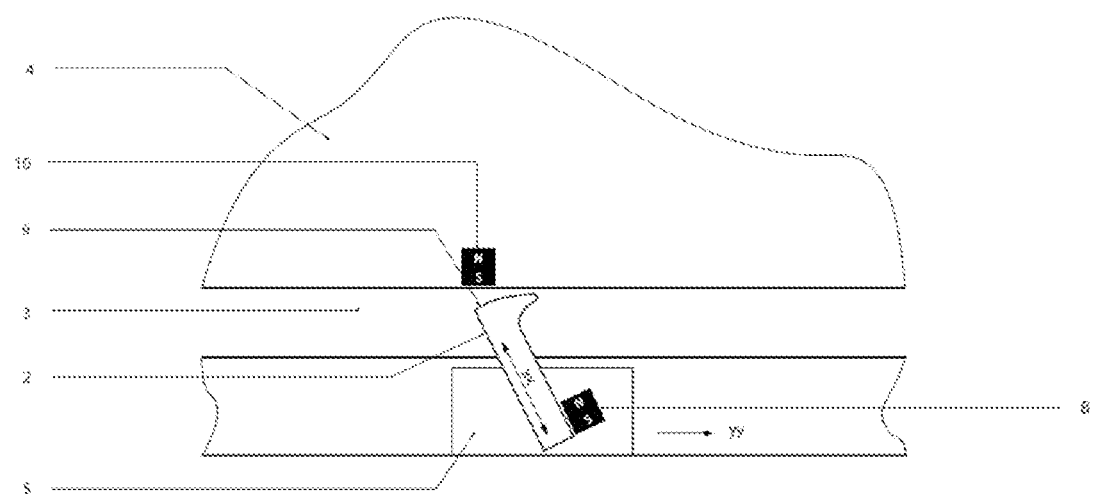
FIG. 10 illustrates a side view of an alternative embodiment to FIG. 9 incorporating a rod shaped second member.

FIG. 10 shows a similar embodiment to that of Example 6, this time using a rod as the first member 2 that translates via line XX instead of rotating about an axis. The rod 2 interacts with a magnet 8 located on the second member 5. As the second member 5 moves in a linear direction YY, the first member rod 2 is drawn out of the second member 5 due to the eddy current induced drag force and inertial force due to movement of the rod 2 in the magnetic field 3.

Example 8

Figure 11:
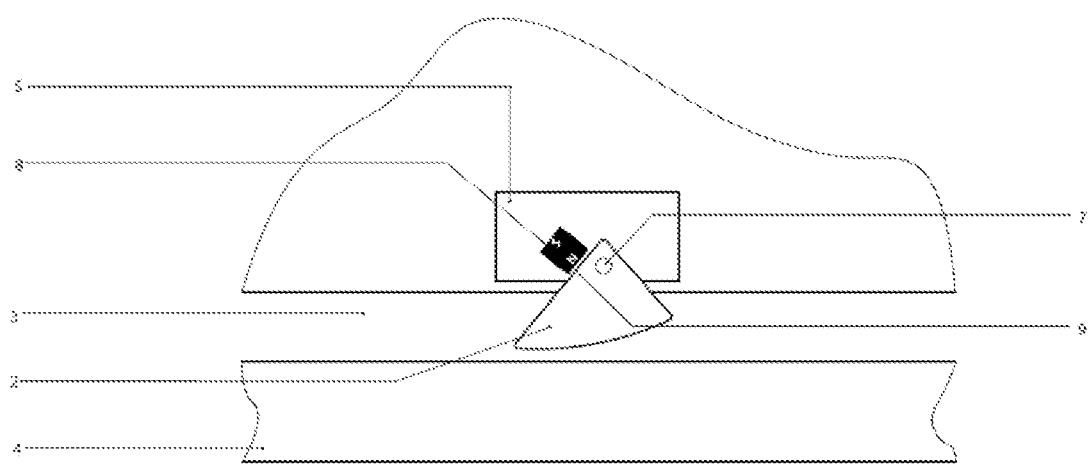
FIG. 11 illustrates a side view of a further alternative with a fixed second member and moving third member.

FIG. 11 shows an embodiment similar to that described in Example 6 however, in FIG. 11, the magnetic field 3 and third member 4 move in linear direction YY and the pawl shaped first member 2 and second member 5 remain stationary relative to the direction YY movement. The movement of the magnetic field 3 overcomes the magnetically induced force between the magnet 8 and a side or all of the first member 2 thereby urging movement of the conductive first member 2 about axis 7 until the first member 2 engages the third member 4 at which point relative movement is halted.

Example 9

Figure 12:
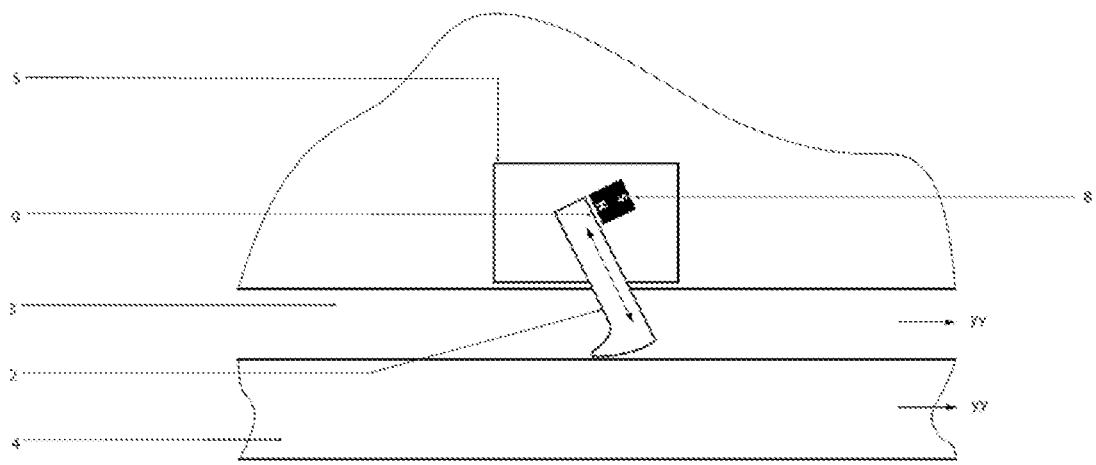
FIG. 12 illustrates a side view of a further alternative to FIG. 11 using a rod shaped first member.

FIG. 12 shows the embodiment of Example 8 however this time using a rod shaped first member 2 described in earlier Examples. As should be appreciated, the first member 2 shape can also be altered in this scenario of a fixed second member 5 and moving magnetic field 3 and latch member 4.

Example 10

Figure 13:
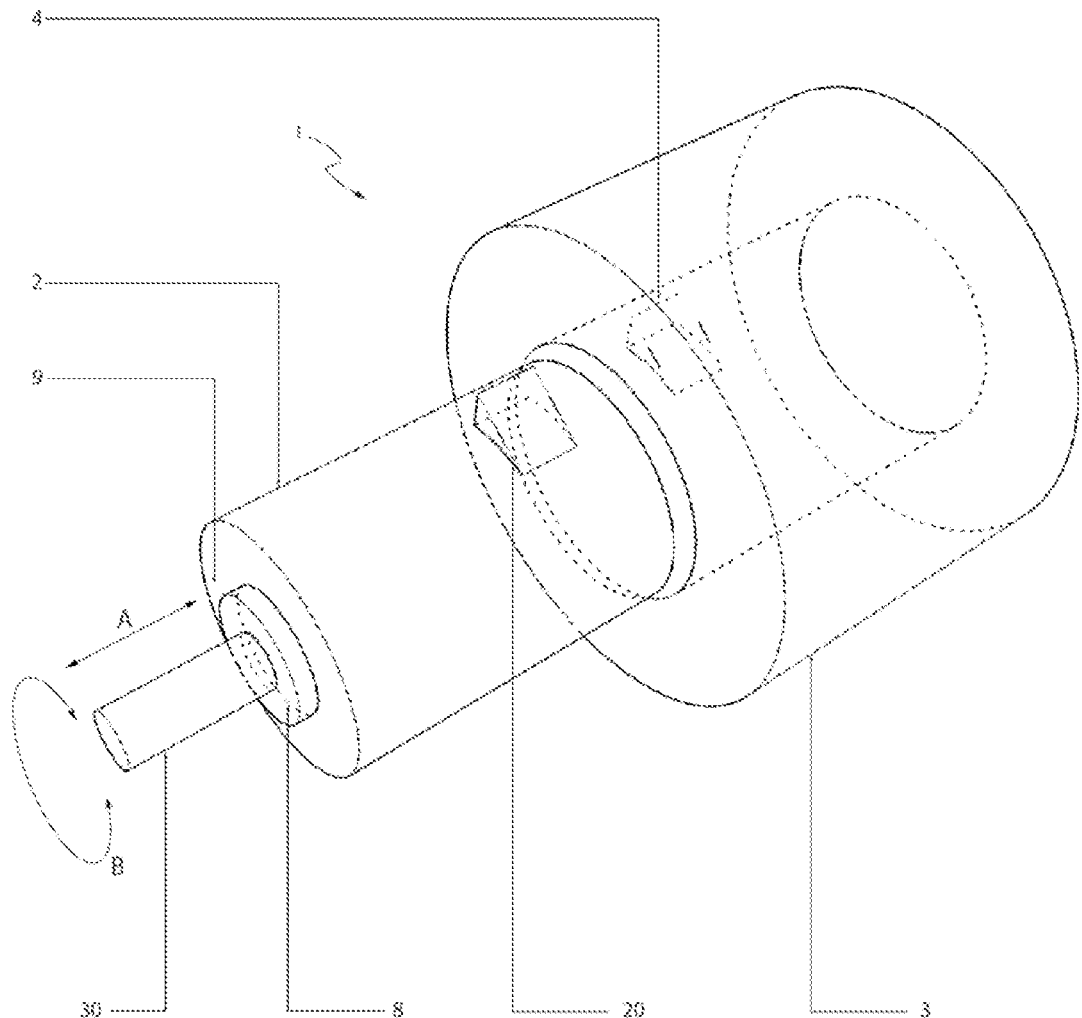
FIG. 13 illustrates a perspective view of a further alternative shaped device.

FIG. 13 illustrates a yet further variation of the device 1. In this example, the first member 2 is formed as a tube. The first member tube 2 may move rotationally about direction B and translate in a linear direction A along the axis of rotation. The first member tube 2 may be moved via translation direction A, into a second member that may be a magnet or magnetized cylinder 3. Translational movement may be restrained by use of a magnet 8 linked to the axis of rotation. The magnet 8 forms a magnetically induced force between the magnet 8 and first member 2 until a sufficient threshold force is reached by an energizing force. When the threshold is reached, the first member 2 translates into the second member 3. Relative variation in movement between the first member 2 and second member 3 induces an eddy current drag that slows rotation of the tube 2 relative to the magnetized cylinder 3. Optionally, a pawl 20 may engage a third member, in this case a latch 4, in this example, the latch 4 may be a mating indentation inside the second member 3 that the pawl 20 interlocks with. A further magnet (not shown) may be incorporated on or in the third member 4 to create a magnetically induced force between the parts. Translational movement of the tube 2 may be urged via a driving mechanism such as a threaded shaft 30.

Aspects of the device have been described by way of example only and it should be appreciated that modifications and additions may be made thereto without departing from the scope of the claims herein.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A brake device comprising:
   a first member formed as a tube, the tube configured to move rotationally about a tube axis of rotation and translate in a linear direction along the tube axis of rotation and wherein the tube or a part thereof is electrically conductive; and
   a second member configured as a magnet or magnetized cylinder;
   wherein translational movement of the tube is restrained by use of a magnet linked to the tube axis of rotation; and
   when a force threshold is overcome, the tube moves in the linear direction along the axis of rotation and in doing so, enters the cylinder and, on entry, eddy current drag forces are induced to slow relative movement between the tube and cylinder.

2. The brake device as claimed in claim 1 wherein, as relative movement slows between the tube and cylinder due to the eddy current drag, a pawl on the tube engages a latch on the cylinder.

3. The brake device as claimed in claim 2 wherein, when the pawl and latch engage, relative movement between the tube and cylinder halts.

4. The brake device as claimed in claim 2 wherein, a further magnet is incorporated on or in the latch that creates a magnetically induced attractive force between the pawl and latch to hold engagement of the pawl and latch once engaged.

5. The brake device as claimed in claim 1 wherein, translational movement of the tube is urged via a driving mechanism.

6. The brake device as claimed in claim 1 wherein, prior to linear movement of the tube, the tube and cylinder do not overlap axially.

7. The brake device as claimed in claim 1 wherein, prior to linear movement of the tube, the tube and cylinder overlap axially.

8. The brake device as claimed in claim 1 when incorporated as a brake in a line dispensing device.

9. A method of tuning timing and extent of relative movement between a tube and cylinder in a brake device by:
   selecting a brake device comprising:
      a first member formed as a tube, the tube configured to move rotationally about a tube axis of rotation and translate in a linear direction along the tube axis of rotation and wherein the tube or a part thereof is electrically conductive; and
      a second member configured as a magnet or magnetized cylinder;
      wherein translational movement of the tube is restrained by use of a magnet linked to the tube axis of rotation; and
      when a force threshold is overcome, the tube moves in the linear direction along the axis of rotation and in doing so, enters the cylinder and, on entry, eddy current drag forces are induced to slow relative movement between the tube and cylinder;
   applying an energizing force to the tube and;
   when the energizing force is below the force threshold no relative axial movement occurs between the tube and cylinder; and
   when the energizing force overcomes the force threshold, the tube moves axially into the cylinder.

10. The method as claimed in claim 9 wherein, when the energizing force is sufficiently large a tube pawl and cylinder latch engage preventing relative movement between the tube and cylinder.

11. A brake device comprising:
    a first member formed as a tube, the tube configured to move rotationally about a tube axis of rotation and translate in a linear direction along the axis of rotation and wherein the tube or a part thereof is magnetic; and
    a second member configured as an electrically conductive cylinder;
    wherein translational movement of the tube is restrained by use of a magnet linked to the tube axis of rotation; and
    when a force threshold is overcome, the tube moves in the linear direction along the axis of rotation and in doing so, enters the cylinder and, on entry, eddy current drag forces are induced to slow relative movement between the tube and the cylinder.

12. The brake device as claimed in claim 11 wherein, as relative movement slows between the tube and cylinder due to the eddy current drag, a pawl on the tube engages a latch on the cylinder.

13. The brake device as claimed in claim 12 wherein, when the pawl and latch engage, relative movement between the tube and cylinder halts.

14. The brake device as claimed in claim 12 wherein, the latch is an indentation inside the cylinder that the pawl interlocks with.

15. The brake device as claimed in claim 12 wherein, a further magnet is incorporated on or in the latch that creates a magnetically induced attractive force between the pawl and latch to hold engagement of the pawl and latch once engaged.

16. The brake device as claimed in claim 11 wherein, translational movement of the tube is urged via a driving mechanism.

17. The brake device as claimed in claim 11 wherein, prior to linear movement of the tube, the tube and cylinder do not overlap axially.

18. The brake device as claimed in claim 11 wherein, prior to linear movement of the tube, the tube and cylinder overlap axially.

19. The brake device as claimed in claim 11 when incorporated as a brake in a line dispensing device.

20. A method of tuning timing and extent of relative movement between a tube and cylinder in a brake device by:
- selecting a brake device comprising:
  - a first member formed as a tube, the tube configured to move rotationally about a tube axis of rotation and translate in a linear direction along the axis of rotation and wherein the tube or a part thereof is magnetic; and
  - a second member configured as an electrically conductive cylinder;
  - wherein translational movement of the tube is restrained by use of a magnet linked to the tube axis of rotation; and
  - when a force threshold is overcome, the tube moves in the linear direction along the axis of rotation and in doing so, enters the cylinder and, on entry, eddy current drag forces are induced to slow relative movement between the tube and the cylinder;
- applying an energizing force to the tube;
- when the energizing force is below the force threshold no relative axial movement occurs between the tube and cylinder; and
- when the energizing force overcomes the force threshold, the tube moves axially into the cylinder.

21. The method as claimed in claim 20 wherein, when the energizing force is sufficiently large a tube pawl and cylinder latch engage preventing relative movement between the tube and cylinder.

* * * * *